(12) United States Patent
Chang et al.

(10) Patent No.: US 11,685,340 B1
(45) Date of Patent: Jun. 27, 2023

(54) WIPER STRUCTURE

(71) Applicant: DANYANG UPC AUTO PARTS CO., LTD., Jiangsu (CN)

(72) Inventors: Che-Wei Chang, Jiangsu (CN); Cheng-Kai Yang, Jiangsu (CN)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 17/576,063

(22) Filed: Jan. 14, 2022

(51) Int. Cl.
  *B60S 1/34* (2006.01)
  *B60S 1/04* (2006.01)
  *B60S 1/38* (2006.01)

(52) U.S. Cl.
  CPC .......... *B60S 1/3411* (2013.01); *B60S 1/0469* (2013.01); *B60S 1/3801* (2013.01); *B60S 1/3806* (2013.01); *B60S 2001/3815* (2013.01)

(58) Field of Classification Search
  CPC .................. B60S 1/0469; B60S 1/3411; B60S 2001/3815; B60S 2001/3813; B60S 1/3801; B60S 1/38
  USPC ............. 15/250.24, 250.46, 250.44, 250.361
  See application file for complete search history.

(56) References Cited

U.S. PATENT DOCUMENTS

| 9,296,362 | B2* | 3/2016 | Yang ..................... B60S 1/3801 |
| 2012/0311808 | A1 | 12/2012 | Yang et al. | |
| 2020/0039472 | A9* | 2/2020 | Young .................. B60S 1/3801 |

OTHER PUBLICATIONS

Search Report dated Jul. 6, 2022 of the corresponding European patent application No. 22152145.3.

* cited by examiner

*Primary Examiner* — Katina N. Henson
(74) *Attorney, Agent, or Firm* — Chun-Ming Shih; HDLS IPR Services

(57) ABSTRACT

The disclosure is a wiper structure. The main wiper frame includes a fixing seat. A pair of secondary wiper frames is connected to two ends of the main wiper frame. Each secondary wiper frame includes a flexible sheet. The flexible sheet is disposed with sliding troughs. A length of the sliding trough is greater than a width of the sliding trough. Multiple engaging frames are evenly disposed on each secondary wiper frame. Each engaging frame includes a pressing wing and a sliding block. The sliding block includes a neck bar with a passing diameter. The passing diameter is less than the trough width. The sliding block of each engaging frame passes through the opening and abuts against each sliding trough through the neck bar. The sliding block is slidable in each sliding trough with a change of an external force exerted on corresponding one of the secondary wiper frames.

8 Claims, 10 Drawing Sheets

WIPER STRUCTURE

BACKGROUND

Technical Field

The disclosure relates to a wiper structure, particularly to a wiper structure installed on a vehicle.

Description of Related Art

A car wiper is disposed outside the glass and connected to a wiper driving arm. The wiper is driven by the driving arm to swing over the glass to remove rain, snow, and/or dirt so as to keep a driver's good vision and increase drive safety.

Also, a desirable wiper structure has to make a blade be closely attached and evenly pressed on a vehicle's windshield to effectively remove dirt or dust on the glass. However, different vehicles' glass has different curvatures. A wiper blade is hard to be evenly pressed on the glass. Thus, the pressure from a wiper blade driven by a driving arm is not even. This causes the wiper blade and the glass cannot be kept in close attachment.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

An object of the disclosure is to provide a wiper structure that may balance pressure, which makes a wiper blade be able to evenly press and be attached on a work surface to effectively perform a sweeping operation.

To accomplish the above object, the disclosure is a wiper structure that may balance pressure, which includes a main wiper frame, a pair of secondary wiper frames, multiple engaging frames, and a blade. The main wiper frame includes a fixing seat. A pair of secondary wiper frame is connected to two ends of the main wiper frame. Each secondary wiper frame includes a flexible sheet. The flexible sheet is disposed with multiple sliding troughs. Each sliding trough includes a trough length and a trough width in size. The trough length is greater than the trough width. The engaging frames are evenly disposed on each secondary wiper frame. Each engaging frame includes a pressing wing and a sliding block. The pressing wing is disposed with an opening. The sliding block includes a neck bar passing through the opening. The neck bar has a passing diameter. The passing diameter is less than the trough width. The sliding block of each engaging frame passes through the opening and abuts against each sliding trough through the neck bar. The sliding block is slidable in each sliding trough with a change of an external force exerted on corresponding one of the secondary wiper frames. The blade is connected under the pressing wings.

In comparison with the related art, the engaging frames of the disclosure are evenly disposed on each secondary wiper frame, the secondary wiper frame is provided with a sliding trough, and each engaging frame includes a pressing wing and a sliding block. The flexible sheet is disposed with sliding troughs. The neck bar of the sliding block has a passing diameter less than the width of the sliding trough. Thus, after the sliding block passes the sliding trough of the flexible sheet, the sliding block is slidable in each sliding trough with a change of an external force exerted on corresponding one of the secondary wiper frames to balance the forces exerted on the pressing wing. As a result, the blade connected under the pressing wing may be evenly pressed to make the blade be attached on the vehicle glass more closely to effectively perform the sweeping action to enhance utility.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
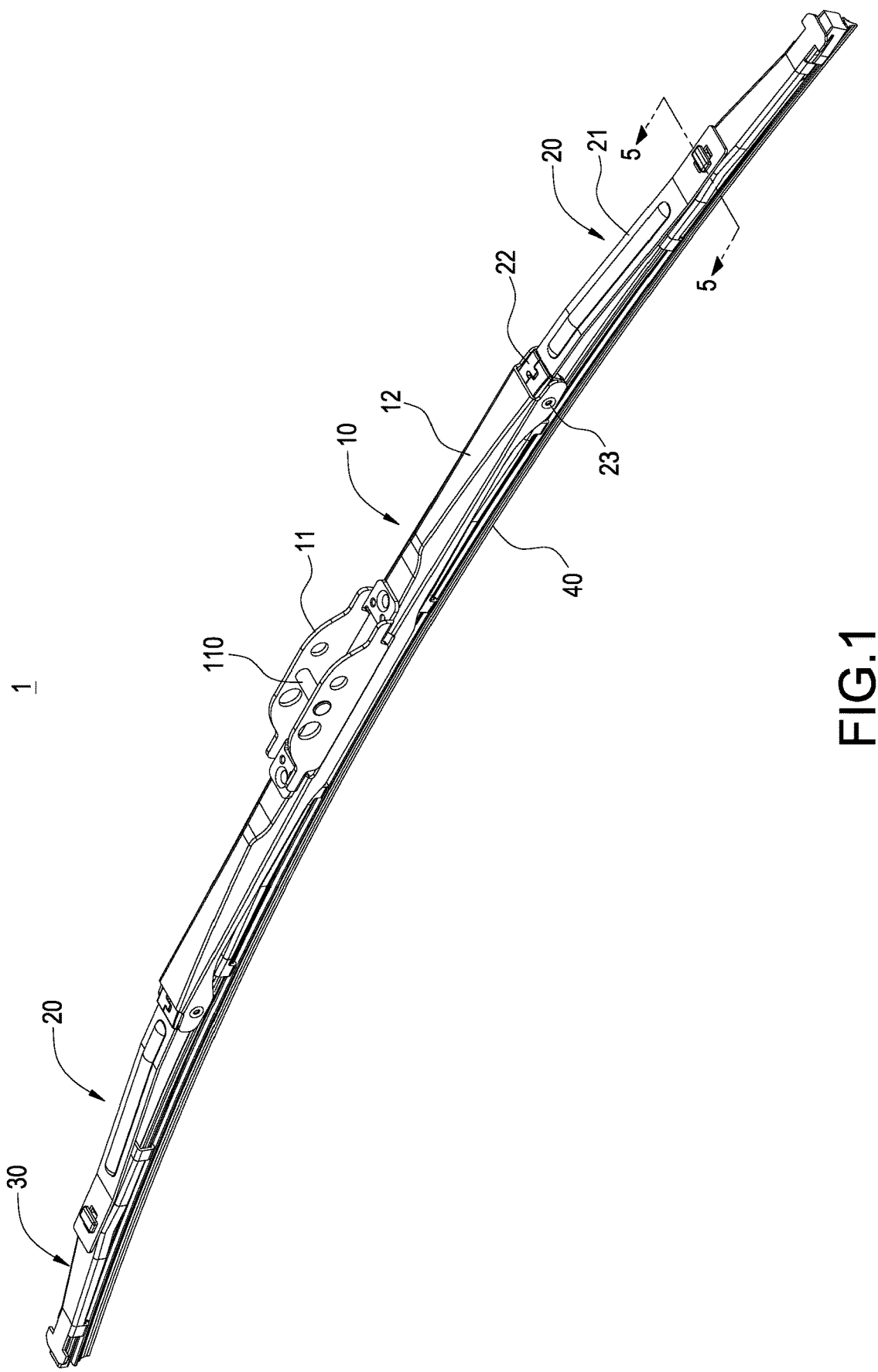
FIG. 1 is a perspective schematic view of the wiper structure of the disclosure.
Figure 2:
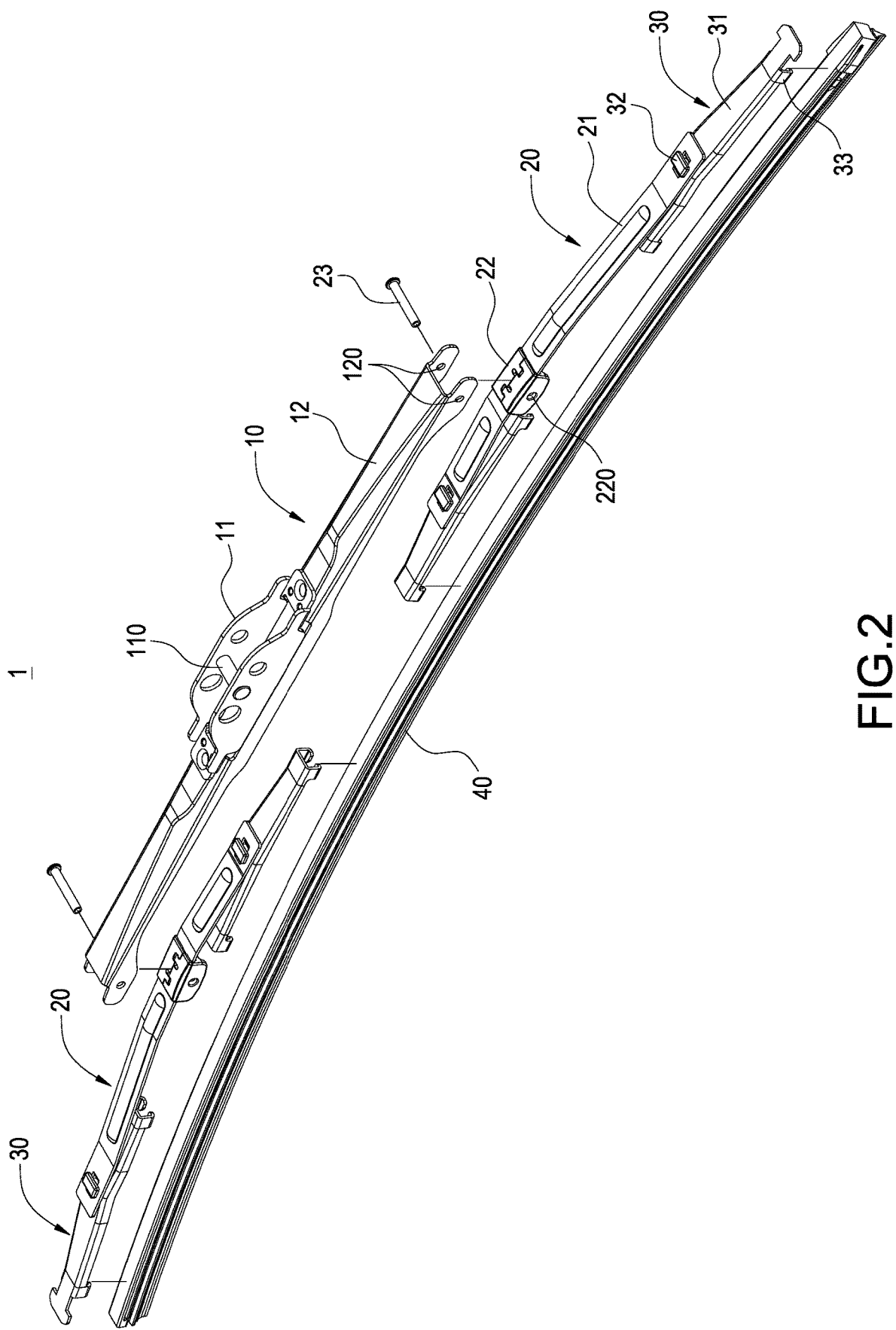
FIG. 2 is an exploded view of the wiper structure of the disclosure.

Please refer to FIGS. 1 and 2, which are a perspective schematic view and an exploded view of the wiper structure that may balance pressure of the disclosure. The wiper structure 1 that may balance pressure of the disclosure which includes a main wiper frame 10, a pair of secondary wiper frames 20, multiple engaging frames 30 and a blade 40. The engaging frames 30 are connected to the blade 40 and fixed on the pair of secondary wiper frames 20. The pair of secondary wiper frames 20 are symmetrically disposed on the main wiper frame 10 to constitute the wiper structure 1. More details are described below.

The main wiper 10 frame includes a fixing seat 11. The fixing seat 11 has a pivot 110. In the embodiment, the main wiper frame 10 further includes a set of fixing arms 12 which is connected to two lateral ends of the fixing seat 11. An end of each fixing arm 12 is formed with a first pivot hole 120. In detail, the pivot hole 110 is connected to a driving arm (not shown in figures).

The pair of secondary wiper frames 20 is connected to two ends of the main wiper frame 10. Each secondary wiper frame 20 includes a flexible sheet 21. In the embodiment, each secondary wiper frame 20 further includes a pivoting seat 22 and a passing rod 23. The pivoting seat 22 has a second pivot hole 220. Also, each secondary wiper frame 20 is pivotally connected to the fixing arm 12 of the main wiper frame 10 by passing the passing rod 23 through the first pivot hole 120 and the second pivot hole 220.

The engaging frames 30 are evenly disposed on each secondary wiper frame 20. Each engaging frame 30 includes a pressing wing 31 and a sliding block 32. In addition, each engaging frame 30 further includes multiple engaging sheets 33 disposed on the pressing wing 31. It is noted that the amount of the engaging frames is not limited, but each secondary wiper frame 20 is disposed with the same amount of the engaging frames 30.

Further, the blade 40 is made of rubber and connected under the pressing wing 31. In the embodiment, the blade 30 is connected on the bottom of the pair of secondary wiper frames 20 by the engaging sheets 33 of the engaging frames 30.

Figure 3:
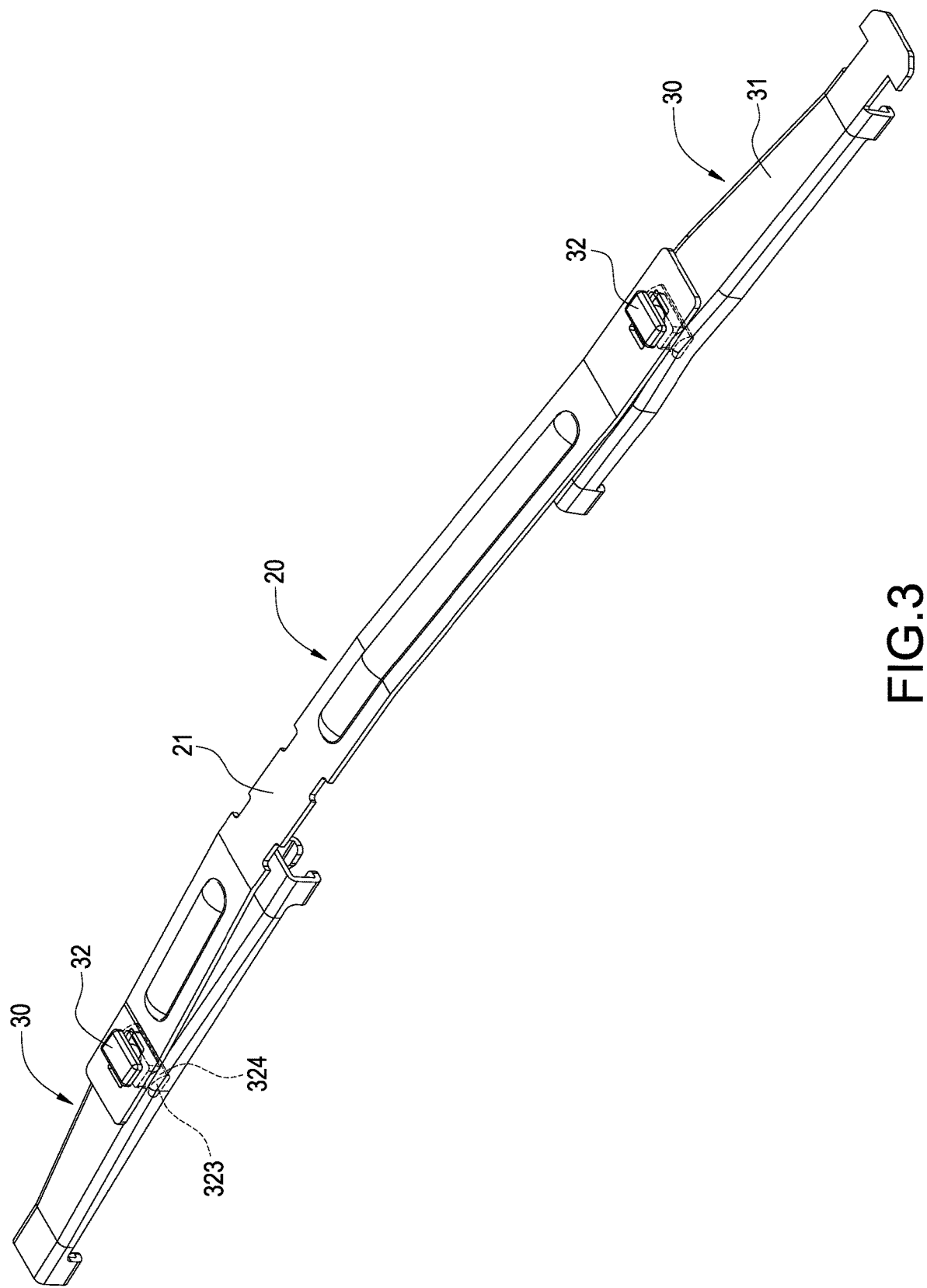
FIG. 3 is an assembled view of the secondary wiper frame and the engaging frame of the disclosure.
Figure 4:
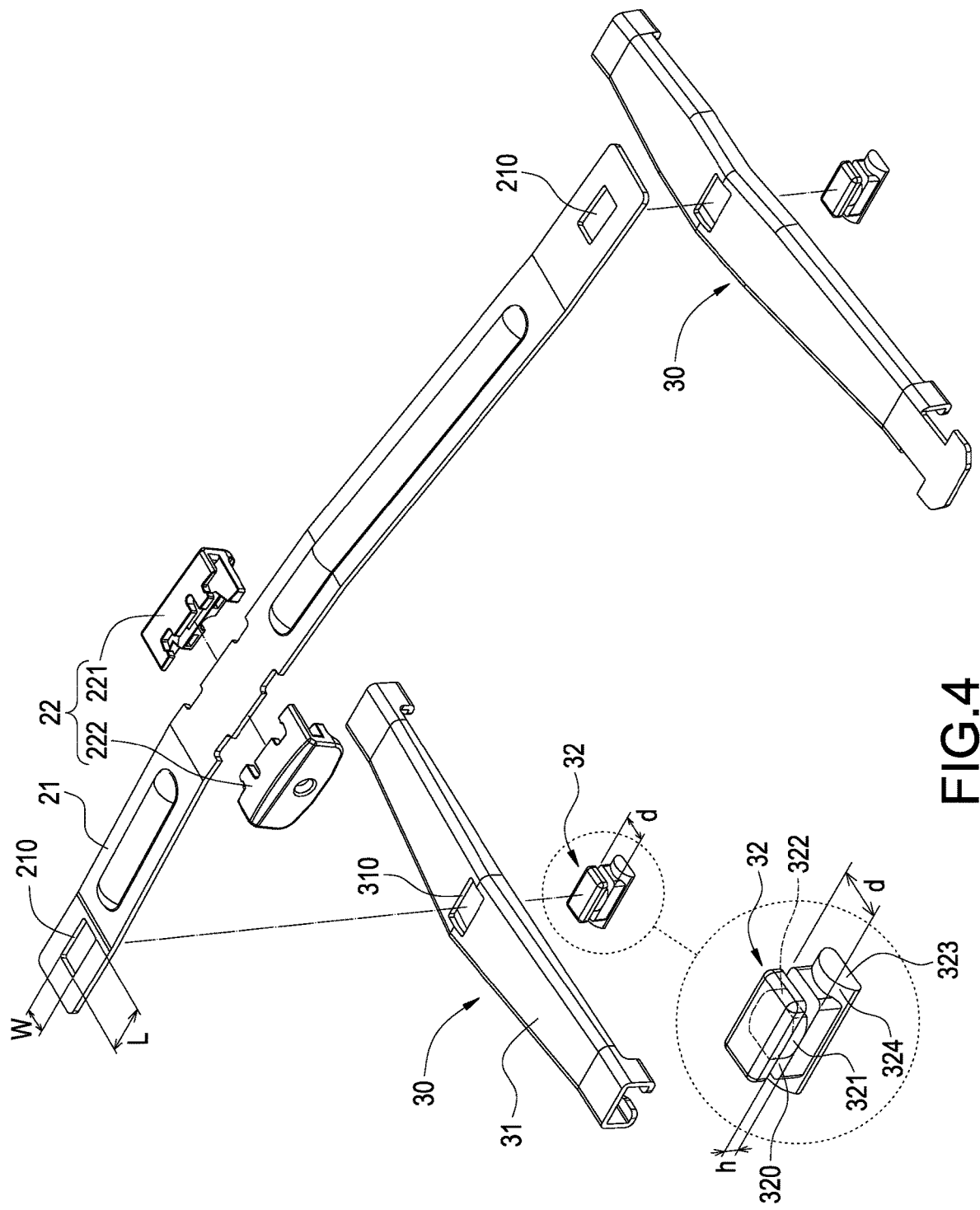
FIG. 4 is an exploded view of the secondary wiper frame and the engaging frame of the disclosure.

Please refer to FIGS. 3 and 4, which are an assembled view of the secondary wiper frame and the engaging frame, and an exploded view of the secondary wiper frame and the engaging frame of the disclosure. In the embodiment, each secondary wiper frame 20 is disposed with, but not limited to, two sets of engaging frames 30. The two sets of engaging frames 30 are separately disposed at two ends of the secondary wiper frame 20.

As shown in FIG. 4, the pivoting seat 22 of the secondary wiper frame 20 includes a first connecting seat 221 and a second connecting seat 222, which are connected to two sides of the flexible sheet 21. Moreover, the flexible sheet 21 is disposed with multiple sliding troughs 210. Each sliding trough 210 has a trough length L and a trough width W in size.

The pressing wing 31 is disposed with an opening 310. The sliding block 32 of the engaging frame 30 includes an engaging trough 320 and a neck bar 321 passing through the opening 310. The neck bar 321 has a passing diameter d and a passing height h. The passing height h is configured correspondingly to a thickness of the flexible sheet 21. As a result, the flexible sheet 21 may be passed in the engaging trough 320 and limited by the opening 310 to be unmovable so as to make the neck bar 321 engage with the flexible sheet 21 and be inseparable from the flexible sheet 21. In some embodiments, a thickness of the flexible sheet 21 is less than or equal to the passing height h.

The trough length L is greater than the trough width W and the passing diameter d is less than the trough width W. Thus, after each sliding block 32 passes the opening 310 of the pressing wing 31, the sliding block 32 abuts against each sliding trough 210 through the neck bar 321. In some embodiments, the passing diameter d is less than the trough width W by at least about 0.2 mm. In addition, the trough length L is approximately 1.5 to 2 times greater than the passing diameter d.

In the embodiment, a thickness of the flexible sheet 21 and the passing height h are approximately 1 mm. In some embodiments, a side of the neck bar 321, which is slidable relative to the sliding trough 210, is formed with a plane 322 for facilitating relative movement.

In the embodiment, the passing diameter d is about 3.6 mm, the trough width is about 3.8 mm and the trough length L is about 6.8 mm. When assembling, the sliding block 32 passes through the opening 310 of the pressing wing 31 first, then the sliding block 32 with the pressing wing 31 passes through the sliding trough 210 and the neck bar 321 is engaged with the sliding trough 210, and finally the sliding block 32 is rotated to make the sliding block 32 be engaged with the sliding trough 210 in a cross manner. As a result, the sliding block 32 is connected to the flexible sheet 21 to be inseparable from the sliding trough 210.

Because the thickness of the flexible sheet 21 is less than the passing height h of the sliding block 32, the blade 40 drives the pressing wing 31 and the sliding block 32 to move upward when the blade 40 is being pressed. At the same time, a gap is formed between the flexible sheet 21 and the sliding block 32 for facilitating the movement of the sliding block 32 relative to the flexible sheet 21.

It is noted that the bottom part of the sliding block 32 has two blocking walls 323 and an abutting surface 324. After the sliding block 32 passes through the opening 310 and is rotated to be placed in the pressing wing 31, the blocking walls 323 of the bottom part of the sliding block 32 abut against the inner walls of the pressing wing 31 to be unrotatable. Also, the sliding block 32 may move upward or downward relative to the flexible sheet 21 through the abutting surface 324 to facilitate the movement of the sliding block 32 relative to the flexible sheet 21.

Figure 5:
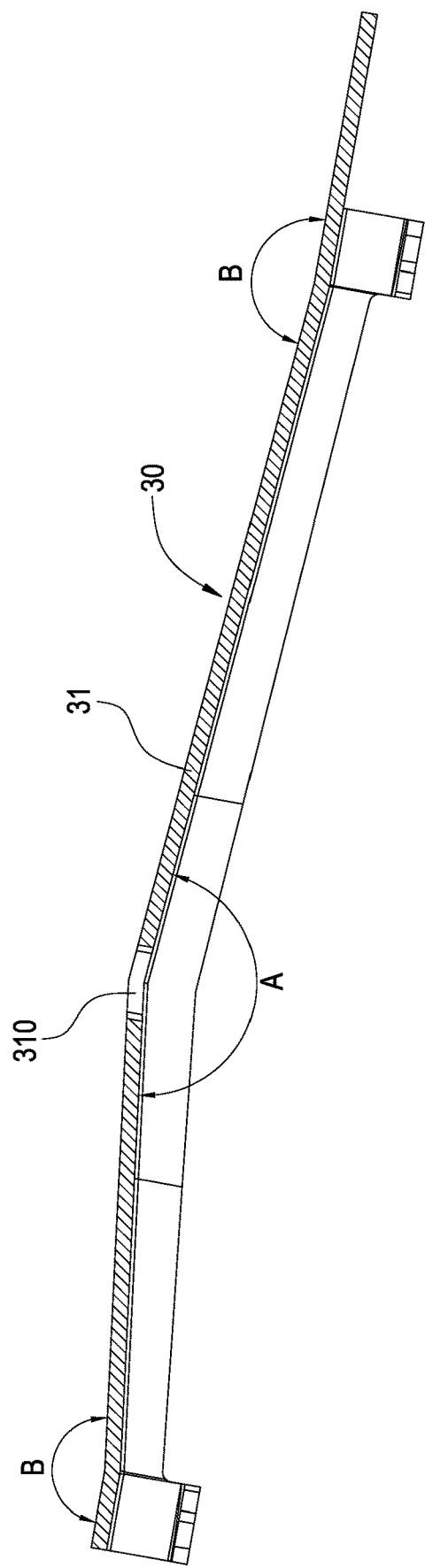
FIG. 5 is a cross-sectional view of the pressing wing of the disclosure.
Figure 6:
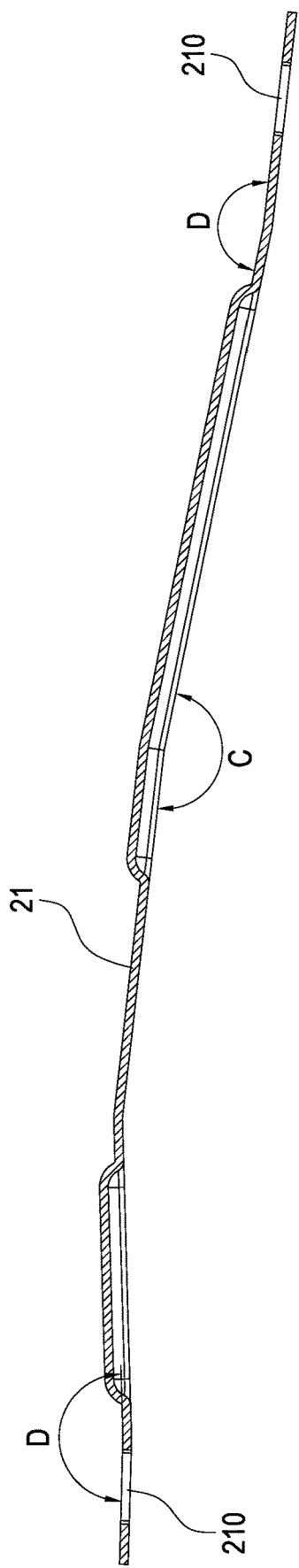
FIG. 6 is a cross-sectional view of the flexible sheet of the disclosure.

Please refer to FIGS. 5 and 6, which are a cross-sectional view of the pressing wing and a cross-sectional view of the flexible sheet of the disclosure. As shown in FIG. 5, the pressing wing 31 of the disclosure is formed with an indented angle A at the position of the opening 310. In addition, each of two distal ends of the pressing wing 31 is formed with a slant angle B. The indented angle A and the slant angle B are separately located on two sides of the pressing wing 31. The indented angle A and the slant angle B facilitate the movement of the sliding block 32 when the pressing wing 31 is under external force. In some embodiments, each of the indented angle A and the slant angle B is, but not limited to, approximately between 170 degrees and 180 degrees.

Moreover, as shown in FIG. 6, a middle portion of the flexible sheet 21 of the disclosure is disposed with a bending angle C. Additionally, each of two distal ends of the flexible sheet 21 is formed with an extending angle D. Also, the bending angle C and the extending angle D facilitate the movement of the sliding block 32 when the flexible sheet 21 is under external force. In some embodiments, each of the bending angle C and the extending angle D is, but not limited to, approximately between 160 degrees and 175 degrees.

Figure 7:
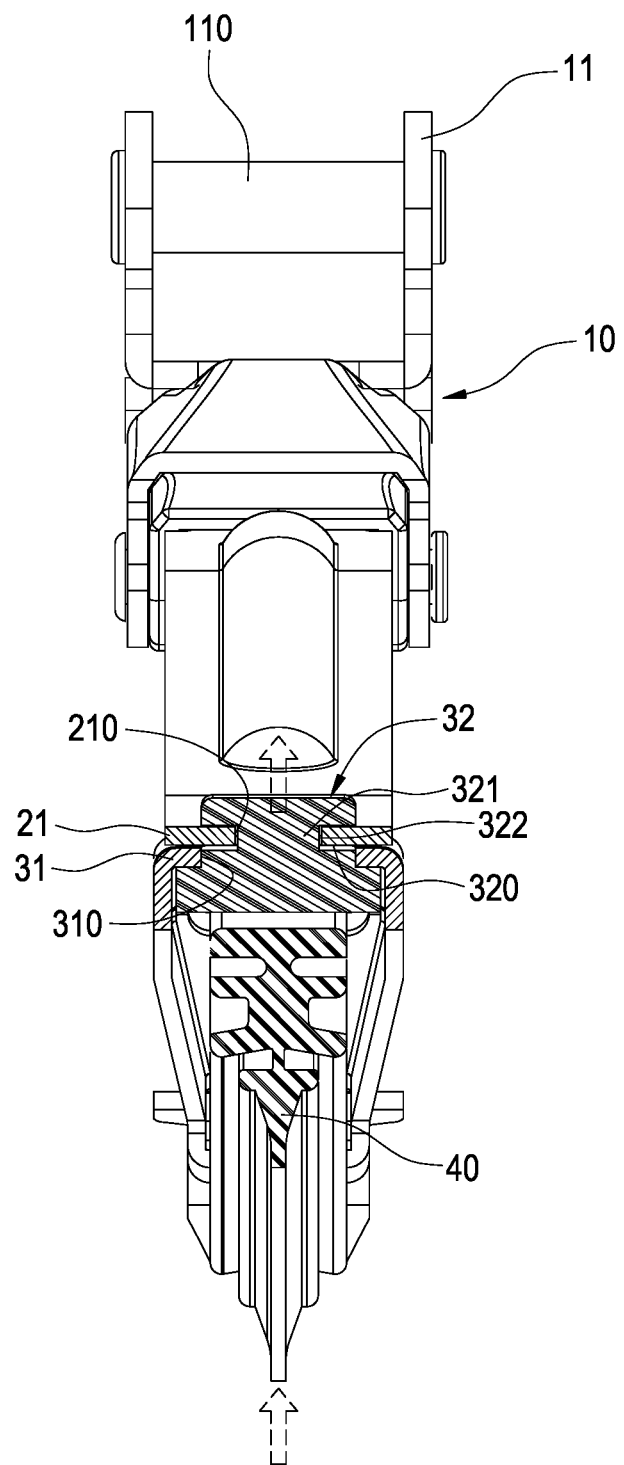
FIG. 7 is a cross-sectional view of the wiper structure of the disclosure along a side direction.
Figure 8:
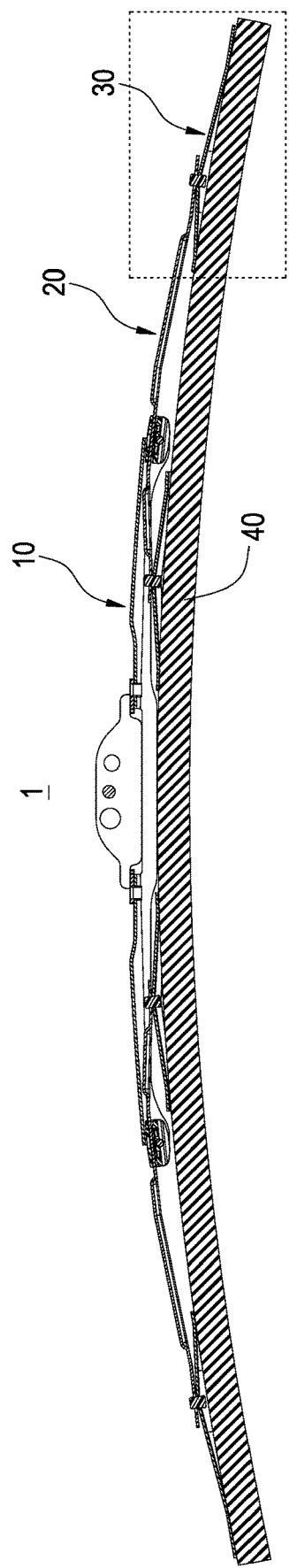
FIG. 8 is a cross-sectional view of the wiper structure of the disclosure along another side direction.

Please refer to FIGS. 7-10, which are a cross-sectional view of the wiper structure from two sides direction, a schematic view of sliding block of the engaging frame before moving, and a schematic view of sliding block of the engaging frame after moving. As shown in FIGS. 7 and 8, the main wiper frame 10 of the wiper structure 10 of the disclosure is connected with the pair of secondary wiper frames 20, and multiple engaging frames 30 are evenly disposed on the pair of secondary wiper frame 20 and connected with the blade 40. Also, the wiper structure 1 is driven by the driving arm to move.

Figure 9:
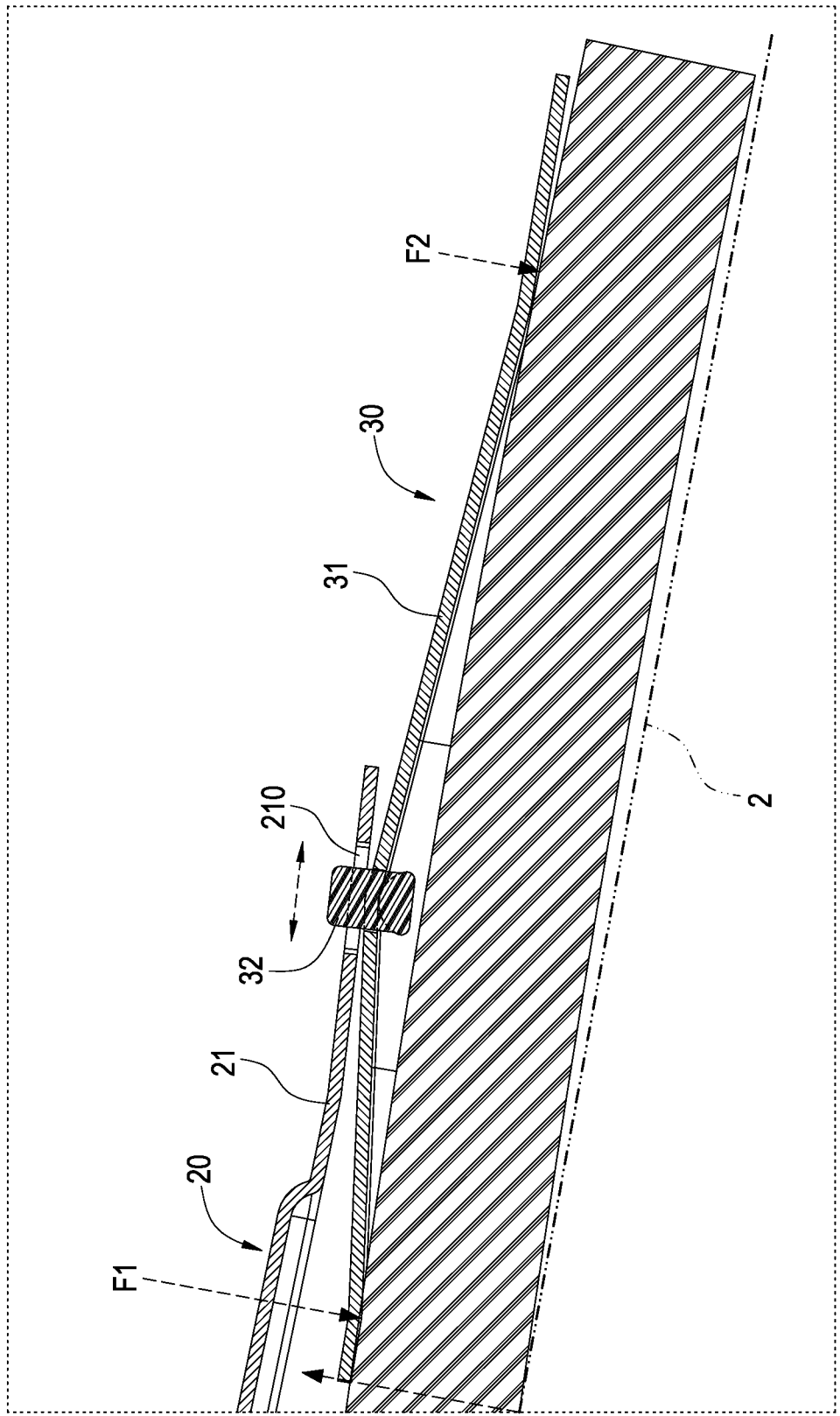
FIG. 9 is a schematic view of sliding block of the engaging frame of the disclosure before moving.

Please refer to FIG. 9. The blade 40 of the disclosure is connected under the pressing wing 30. Also, the wiper structure 1 is disposed over a vehicle glass 2. In the embodiment, the vehicle glass 2 is a curved surface, the blade 40 is not attached on the glass surface when the wiper structure 1 is driven by the driving arm, so the force exerted on the pressing arm 31 is not even and makes the wiper structure 1 be unable to closely sweep the vehicle glass 2.

It is noted that the sliding block 32 passing through the pressing wing 31 is slidable in each sliding trough 210 with a change of an external force exerted on corresponding one of the secondary wiper frames 20 to make the action force on the pressing wing 31 reach a balance state.

In the embodiment, the force exerted on the pressing arm 31 is not even, so the action force F1 exerted at the left of the pressing wing 31 is greater than the action force F2 exerted at the right of the pressing wing 31. As a result, the sliding block 32 in the sliding trough 210 moves rightward to balance the forces exerted on the pressing wing 31.

Figure 10:
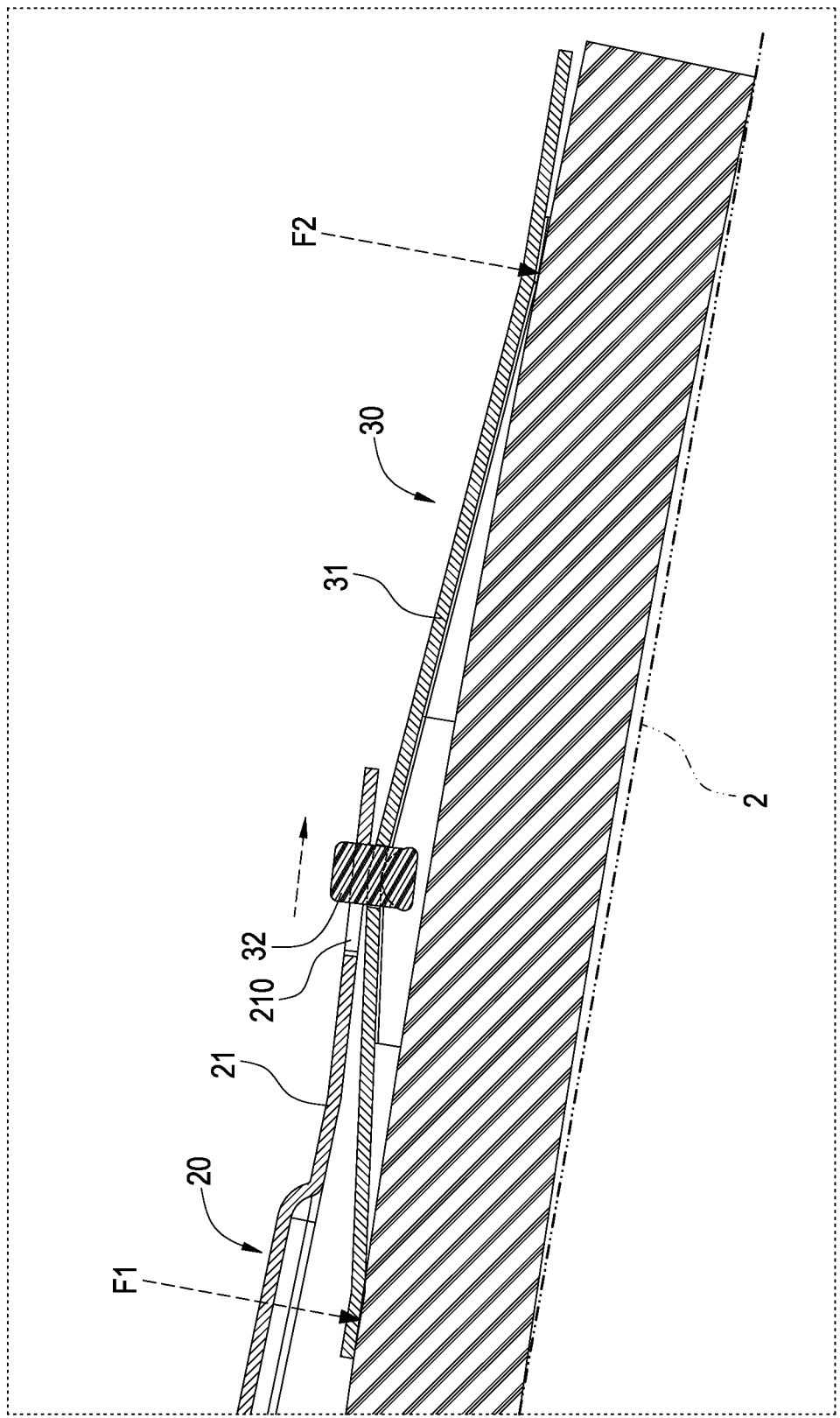
FIG. 10 is a schematic view of sliding block of the engaging frame of the disclosure after moving.

Please refer to FIG. 10. After the sliding block 32 has moved rightward, the action force F1 on the left side is approximately equal to the action force F2 on the right side. As a result, the blade 40 connected under the pressing wing 31 may be evenly pressed to make the blade 40 be closely attached on the vehicle glass 2 to effectively perform the sweeping action.

While this disclosure has been described by means of specific embodiments, numerous modifications and variations could be made thereto by those skilled in the art without departing from the scope and spirit of this disclosure set forth in the claims.

What is claimed is:

1. A wiper structure, comprising:
a main wiper frame, comprising a fixing seat;
a pair of secondary wiper frame, connected to two ends of the main wiper frame, each secondary wiper frame comprising a flexible sheet, the flexible sheet comprising multiple sliding troughs, each sliding trough comprising a trough length and a trough width in size, and the trough length greater than the trough width;
multiple engaging frames, evenly disposed on each secondary wiper frame, each engaging frame comprising a pressing wing and a sliding block, the pressing wing comprising an opening, the sliding block comprising a neck bar passing through the opening, the neck bar comprising a passing diameter less than the trough width by at least 0.2 mm, the passing diameter less than the trough width, the sliding block of each engaging frame passing through the opening and abutting against each sliding trough through the neck bar, and the sliding block slidable in each sliding trough with respect to a change of an external force exerted on corresponding one of the secondary wiper frames; and
a blade, connected under the pressing wings,
wherein the neck bar comprises a plane disposed on a side thereof slidable with respect to the sliding trough so that a gap is formed between the flexible sheet and the sliding block for facilitating a movement of the sliding block relative to the flexible sheet.

2. The wiper structure of claim 1, wherein the trough length is approximately 1.5 to 2 times greater than the passing diameter.

3. The wiper structure of claim 1, wherein the neck bar comprises a passing height, and a thickness of the flexible sheet is equal to or less than the passing height.

4. The wiper structure of claim 1, wherein the thickness of the flexible sheet and the passing height are approximately 1 mm, respectively.

5. The wiper structure of claim 1, wherein the pressing wing comprises an indented angle defined at a position of the opening and a slant angle defined at two distal ends thereof respectively, and the indented angle and the slant angle are between 170 degrees and 180 degrees respectively.

6. The wiper structure of claim 1, wherein the flexible sheet comprises a bending angle defined at a middle portion thereof and an extending angle defined at two distal ends thereof, and the bending angle and the extending angle are between 160 degrees and 175 degrees respectively.

7. The wiper structure of claim 1, wherein the sliding block comprises two blocking walls and an abutting surface disposed on a bottom part thereof, the blocking walls on two sides of the bottom part of the sliding block abut against an inner wall of the pressing wing for the sliding block to be nonrotatable after the sliding block is being disposed to the pressing wing and being rotated, and the sliding block move upward or downward relative to the flexible sheet through the abutting surface.

8. The wiper structure of claim 1, wherein the main wiper frame comprises a first pivot hole respectively disposed on two ends thereof, each secondary wiper frame further comprises a pivoting seat and a passing rod, the pivoting seat comprises a second pivot hole, each secondary wiper frame is pivotally connected to the main wiper frame in a manner of the passing rod passing through the first pivot hole and the second pivot hole.

\* \* \* \* \*